United States Patent [19]

Calkins et al.

[11] 3,724,375

[45] Apr. 3, 1973

[54] ILLUMINATING FLARE HAVING HIGH DRAG CONFIGURATION

[75] Inventors: Burton H. Calkins, Bloomington, Ind.; Dale L. Carstens, Sault Sainte Marie, Mich.; James J. Riester, Bloomington, Ind.

[73] Assignee: The United States of America as represented by the Secretary of the Navy

[22] Filed: Apr. 6, 1970

[21] Appl. No.: 31,040

[52] U.S. Cl. ....................102/31, 102/35, 102/37.6
[51] Int. Cl. .................................................C06d 1/04
[58] Field of Search............102/37.5, 31, 37.6, 1, 79, 102/99, 100, 101, 102, 103, 37.8

[56] References Cited

UNITED STATES PATENTS

| | | | |
|---|---|---|---|
| 1,152,917 | 9/1915 | Schneider | 102/79 X |
| 1,274,258 | 7/1918 | Gerdom | 102/101 |
| 3,372,643 | 3/1968 | Kuaule | 102/99 |
| 3,500,714 | 3/1970 | Cullinane | 89/1 R |
| 3,566,791 | 3/1971 | Lohkamp | 102/37.6 X |
| 3,580,180 | 5/1971 | Gawlick | 102/101 |

FOREIGN PATENTS OR APPLICATIONS

| | | | |
|---|---|---|---|
| 389,249 | 3/1933 | Great Britain | 102/37.5 |
| 353,090 | 7/1931 | Great Britain | 102/37.5 |

OTHER PUBLICATIONS

Jet Propulsion; Apr. 1958; A Practical Mathematical Approach To Grain Design; by Max W. Stone, pp. 236–244

Primary Examiner—Robert F. Stahl
Attorney—R. S. Sciascia, H. H. Losche and Paul S. Collignon

[57] ABSTRACT

A flat, circular flare having a thin-walled plastic case containing a disk of pyrotechnic material provided with a star-center and having a fuze means for igniting said pyrotechnic material. The flat, circular flare is launched from an aircraft by spinning and the flare floats or sails to the ground while burning.

2 Claims, 2 Drawing Figures

PATENTED APR 3 1973　　　　　　　　　　　　　　3,724,375

INVENTORS
BURTON H. CALKINS
JAMES J. RIESTER
BY DALE L. CARSTENS

ILLUMINATING FLARE HAVING HIGH DRAG CONFIGURATION

STATEMENT OF GOVERNMENT INTEREST

The invention described herein may be manufactured and used by or for The Government of the United States of America for governmental purposes without the payment of any royalties thereon or therefor.

BACKGROUND OF THE INVENTION

The present invention relates to an illuminating flare and more particularly to an illuminating flare that is to be launched from an aircraft for the purpose of illuminating the area below the aircraft.

Various types of illuminating flares are presently available for dropping from an aircraft and consist basically of a cannister or container of pyrotechnic composition which is suspended by a parachute. Such a device is shown in U.S. Pat. No. 1,755,388 which issued Apr. 22, 1930, to George Clark and Ernest Jones. While various improvements to aircraft parachute flares have been made over the years, particularly with improved ignition devices and better illuminating compositions, practically all flares still utilize a parachute to slow the descent of the flare in its fall to the ground.

The use of a parachute on an illuminating flare, however, has several disadvantages, one of which is the high cost of manufacturing and rigging the parachute. Also, after the illuminating composition is consumed, the empty container attached to the parachute does not have much weight and the unit may float and drift for considerable time and provide a hazard to air traffic. This problem of drifting aircraft parachute flares is of particular concern in a military zone where hundreds of flares may be dropped in a very short time.

SUMMARY OF THE INVENTION

The present invention relates to an illuminating flare that is designed for launching from an aircraft without using a parachute. A cast or pressed disk of illuminating composition is housed in a thin-walled plastic container and a fuze is provided in the center of the disk to ignite the composition. The flare is launched by spinning about an axis perpendicular to a flat disk surface and gyroscopic forces are generated which retard the motion of the disk toward a low drag attitude.

DESCRIPTION OF THE PREFERRED EMBODIMENT

Figure 1:
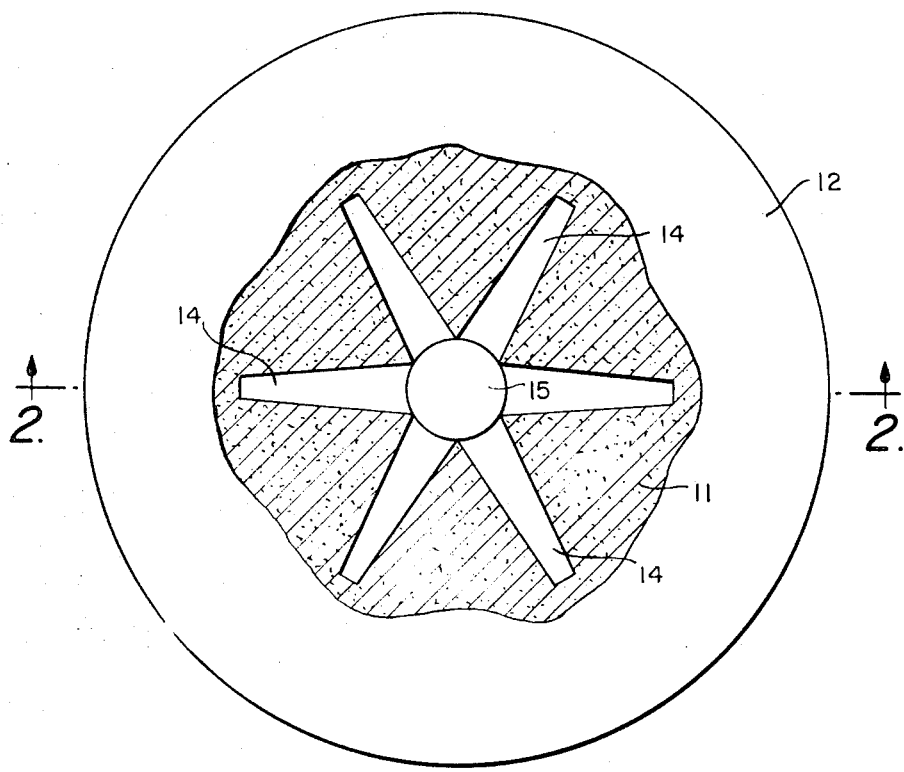
FIG. 1 is a top plan view, partially broken away, showing a preferred embodiment of the present invention.
Figure 2:
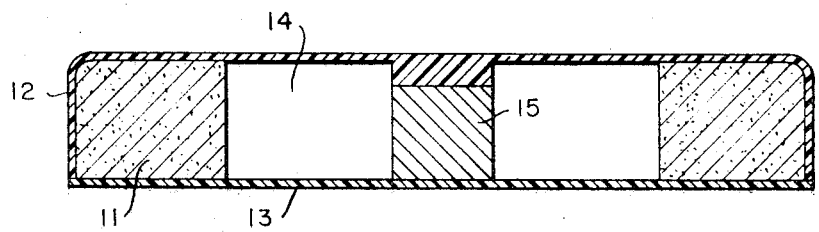
FIG. 2 is a sectional view taken on line 2—2 of FIG. 1.

Referring now to the drawing, there is shown a circular disk 11 of illuminating composition that is enclosed by housing 12 and cover 13. By way of example, the illuminating composition might be comprised of about 58 percent of granulated magnesium, about 37.5 percent of sodium nitrate and about 4.5 percent of a resinous binder. Housing 12 is preferably made of a thermosetting plastic material and cover 13 is preferably made of a thermoplastic material. A star-shaped center cavity 14 is provided to facilitate burning of the illuminating composition.

An arming fuze 15 is provided at the center of the star cavity to ignite the illuminating composition. By way of example, arming fuze 15 might be of the spin to arm type which are well-known in the fuze art. Generally, these spin to arm fuzes require a first spin rate to arm the fuze and then, upon decay of the spin rate, the fuze will function to actuate a firing pin which strikes a primer.

Circular disk 11 is designed to meet the aerodynamic requirements of a high drag flat plate and the ratio of the disk diameter to its thickness must be at least 6 to 1. As flat plates exhibit high drag only when the broad side of the plate is perpendicular to the air flow, without some stabilizing force a flat plate will not free fall in a high drag mode. By spinning the disk about an axis perpendicular to the flat plate, gyroscopic forces are generated that retard the motion of the plate toward a low drag attitude.

By calculations and experiments conducted at Naval Ammunition Depot, Crane, Indiana, it has been determined that illuminating flare with star-shaped cavities that burn from the center out in the fashion of a rocket grain, burn with normal efficiency of 40,000 CP-sec/gram. Also it has been determined that as a five million candlepower flare falls from an altitude of 3,500 feet to an altitude of 1,000 feet, there is a circular area on the ground one mile in diameter that is illuminated to a minimum of 0.2 lumens per square foot. Twelve pounds of illuminating composition comprised of about 58 percent of granulated magnesium, about 37.5 percent of sodium nitrate and about 4.5 percent of a resinous binder, burning at 40,000 CP-sec/gram will produce five million candlepower for a period of 43.6 seconds. It was determined that 12 pounds of illuminating composition could be pressed into a circular disk of 12 inches in diameter and 2 inches thick. During burning, the disk will loose mass at the rate of 0.207 pounds per second and, while burning, will fall about 2700 feet.

We claim:

1. An illuminating flare having high drag configuration comprising:
   a circular disk of illuminating composition having a diameter to thickness ratio of at least 6 to 1,
   a plastic container enclosing said circular disk of illuminating composition, and
   means positioned in the center of said circular disk for igniting said circular disk of illuminating composition whereby upon ignition said illuminating composition burns from the center outwardly toward the edge.

2. An illuminating flare as set forth in claim 1 wherein a star-shaped cavity is provided in the center of said circular disk of illuminating composition to facilitate burning.

* * * * *